United States Patent
Kawano et al.

(10) Patent No.: US 9,524,065 B2
(45) Date of Patent: Dec. 20, 2016

(54) CAPACITANCE OPERATION DEVICE AND METHOD OF MANUFACTURING THE SAME

(71) Applicant: DENSO CORPORATION, Kariya, Aichi-pref. (JP)

(72) Inventors: Shinji Kawano, Nagoya (JP); Hiroyuki Mimura, Kariya (JP); Atsushi Katoh, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 143 days.

(21) Appl. No.: 14/248,636

(22) Filed: Apr. 9, 2014

(65) Prior Publication Data
US 2014/0307182 A1    Oct. 16, 2014

(30) Foreign Application Priority Data
Apr. 11, 2013 (JP) ................. 2013-083067

(51) Int. Cl.
G06F 3/041 (2006.01)
G06F 3/044 (2006.01)

(52) U.S. Cl.
CPC .......... *G06F 3/044* (2013.01); *Y10T 156/1064* (2015.01)

(58) Field of Classification Search
None
See application file for complete search history.

(56) References Cited

U.S. PATENT DOCUMENTS

2012/0160657 A1* 6/2012 Mizushima ............ G01L 1/142
                                                                200/600
2012/0222805 A1    9/2012 Shintani et al.
2013/0224417 A1    8/2013 Ogata et al.

FOREIGN PATENT DOCUMENTS

| JP | 2001-205760 | 7/2001 |
| JP | 2006-064840 | 3/2006 |
| JP | 2010-165094 | 7/2010 |
| JP | 2012-102317 | 5/2012 |
| JP | 2012-145999 | 8/2012 |
| JP | 2012-184324 | 9/2012 |

\* cited by examiner

*Primary Examiner* — Christopher R Lamb
(74) *Attorney, Agent, or Firm* — Harness, Dickey & Pierce, P.L.C.

(57) ABSTRACT

A capacitance operation device includes an operation plate, an electrode, and an electrode film. The operation plate has an operation surface to be contact-operated by an operation body. The electrode outputs a detection signal according to a change in capacitance generated between the electrode and the operation body. The electrode film supports the electrode. The operation plate has a rear surface on a side opposite to the operation surface. The rear surface is formed with a groove. The groove is filled with an adhesive agent, and the electrode film is adhered to the operation plate with the adhesive agent.

6 Claims, 5 Drawing Sheets

CAPACITANCE OPERATION DEVICE AND METHOD OF MANUFACTURING THE SAME

CROSS REFERENCE TO RELATED APPLICATION

This application is based on Japanese Patent Application No. 2013-83067 filed on Apr. 11, 2013, the disclosure of which is incorporated herein by reference.

TECHNICAL FIELD

The present disclosure relates to a capacitance operation device that detects a change in capacitance caused when a user contact-operates an operation surface of an operation plate with an operation body, and a method of manufacturing the capacitance operation device.

BACKGROUND

For example, JP 2010-165094 A discloses a capacitance touch sensor including an electrode layer, a surface sheet onto which a detection body contacts, and an adhesive layer between the electrode layer and the surface sheet.

FIG. 10 illustrates a capacitance operation device. In the capacitance operation device, an electrode film 20x is adhered to an operation plate 10x with an adhesive tape 90. When a user's fingertip F contacts an operation surface 11 of the operation plate 10x, a capacitance between an electrode 21 of the electrode film 20 and the fingertip F changes. The capacitance operation device detects the contact of the fingertip F onto the operation plate 10x based on the change of the capacitance.

SUMMARY

It is an object of the present disclosure to provide a capacitance operation device with improved detection accuracy and improved adhering reliability, and a method of manufacturing the capacitance operation device.

According to an aspect of the present disclosure, a capacitance operation device includes an operation plate, an electrode, and an electrode film supporting the electrode. The operation plate has an operation surface to contact-operated by an operation body. The electrode outputs a detection signal according to a change in capacitance generated between the operation body and the electrode. The operation plate has a rear surface on a side opposite to the operation surface, and the rear surface is formed with a groove. The groove is filled with an adhesive agent. The electrode film is adhered to the operation plate with the adhesive agent.

In this structure, the electrode film is adhered to the operation plate with the adhesive agent. Therefore, the electrode film is firmly adhered to the operation plate, as compared with an adhering structure using an adhesive tape. Therefore, the reliability of adhering of the electrode film improves.

Further, the adhesive agent is filled in the groove formed on the rear surface of the operation plate. The portions of the rear surface where the groove is not formed is in contact with the electrode film without being adhered with the adhesive agent. Therefore, the distance between the operation surface and the electrode is not affected by the adhesive agent. As such, the accuracy of detecting the contact improves.

Accordingly, the detection accuracy improves, and the reliability of adhering of the electrode film improves.

In a method of manufacturing the capacitance operation device, a groove is formed on the rear surface of the operation plate, and a liquid-state adhesive agent is filled in the groove. An excess liquid-state adhesive agent overflowing from the groove is removed from the rear surface of the operation plate, and an electrode film supporting an electrode is adhered to the rear surface of the operation plate by curing the liquid-state adhesive agent filled in the groove in a state where the electrode film 20 is pressed against the rear surface of the operation plate.

In this case, the electrode film is adhered to the operation plate by curing the liquid-state adhesive agent. Therefore, the electrode film can be firmly adhered to the operation plate. Accordingly, the reliability of adhering improves.

In addition, the adhesive agent is filled in the groove formed on the are surface of the operation plate, and the electrode film is adhered to the operation plate by pressing the electrode film against the rear surface of the operation plate. In this case, the excess liquid-state adhesive agent overflowing from the grooves is removed. Therefore, the portion of the rear surface where the groove is not formed can contact the electrode film without through the adhesive agent. As such, the distance between the operation surface and the electrode will not be affected by the adhesive agent, and hence the detection accuracy improves.

Accordingly, the detection accuracy improves, and the reliability of adhering of the electrode film improves.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 10:
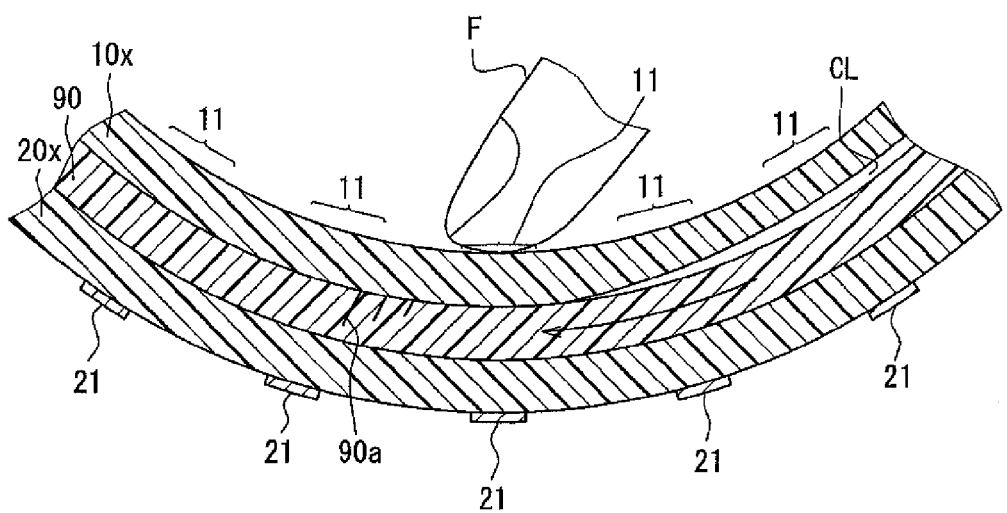
FIG. 10 is a cross-sectional view of a capacitance operation device as a related art.

In the adhering structure where the operation plate 10x and the electrode film 20x are adhered to each other through the adhesive tape 90, as shown in FIG. 10, there is a possibility that the adhesive tape 90 is separated, and thus the reliability of adhering is insufficient. In particular, in the case where the operation plate 10x has a curved shape, it is difficult to fit the adhesive tape 90 with the curved surface and thus wrinkles 90a are likely to be generated in the adhesive tape 90 during an adhering process. In such a case, the adhesive tape 90 is likely to be separated from the operation plate 10x at positions where the wrinkles 90a are generated.

Even if the wrinkles 90a are not generated, the adhesive tape 90 receives a tensile stress for a long term due to the curved shape of the operation plate 10x, as shown by an arrow in FIG. 10. As a result, the adhesive tape 90 is likely to be easily separated. Further, when the adhesive tape 90 is separated and a clearance CL is generated, a distance between the operation surface 11 and the electrode 21 increases. With this, the capacitance generated between the electrode 21 and the fingertip F reduces, resulting in a malfunction of the capacitance operation device.

In order to solve this issue, the inventors studied to use an adhesive agent, in place of the adhesive tape 90. In this case, the adhesive agent is an agent that can adhere the electrode film 20x to the operation plate 10x by chemically changing a surface of the electrode film 20x and a surface of the operation plate 10x when being cured. In this case, the reliability of adhering improves, as compared with the adhering structure using the adhesive tape 90.

However, it is difficult to apply the adhesive agent to the operation plate 10x with a uniform thickness. The distance between the operation surface 11 and the electrode 21 increases with an increase in thickness of the adhesive agent. As a result, the change in capacitance is deviated, and the accuracy of detecting the contact of the fingertip F onto the operation plate 10x is degraded.

Hereinafter, exemplary embodiments of a capacitance operation device and a method of manufacturing the capacitance operation device of the present disclosure will be described with reference to the drawings. Like parts will be designated with like reference numbers, and the descriptions thereof will not be repeated.

First Embodiment

Figure 1:
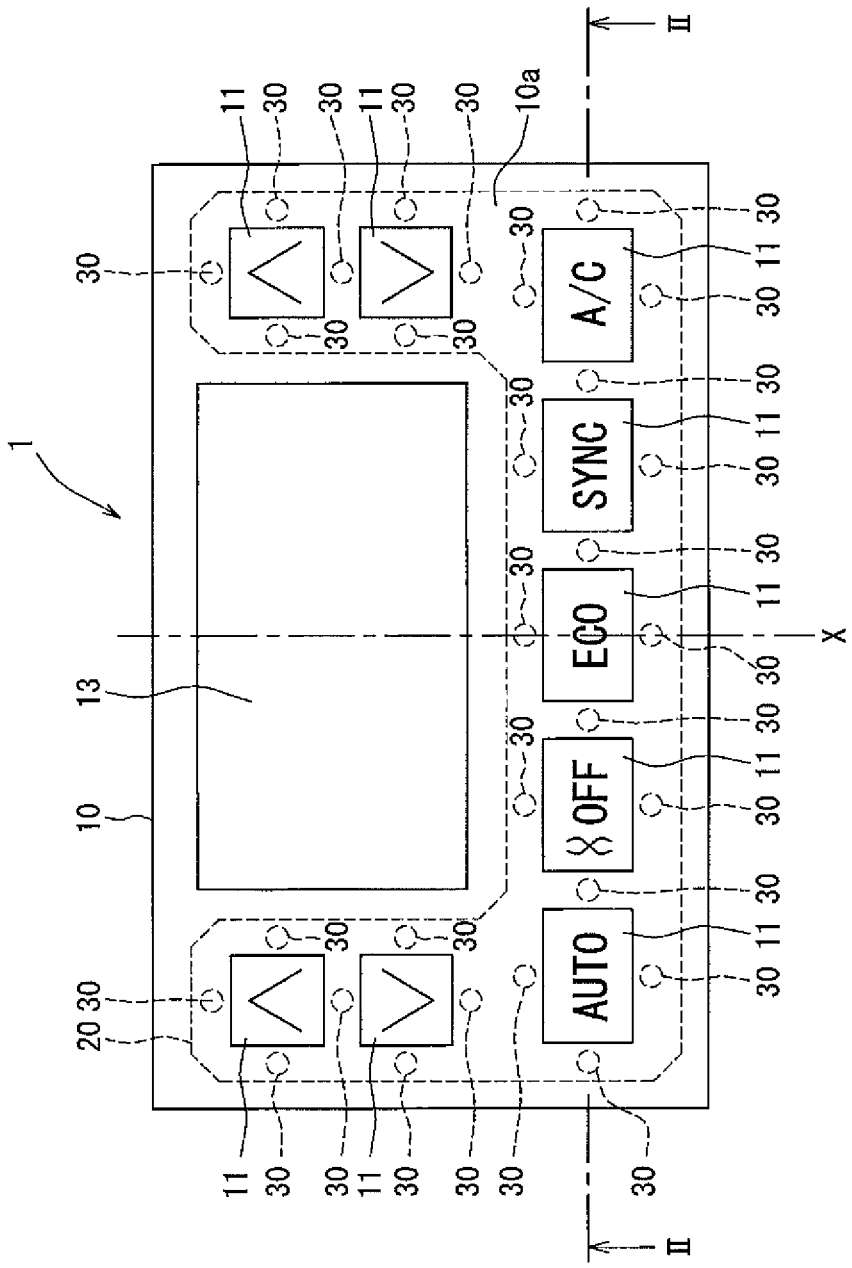
FIG. 1 is a plan view of a capacitance operation device according to a first embodiment of the present disclosure.

Referring to FIG. 1, a capacitance operation device 1 of a first embodiment is, for example, disposed in an instrument panel of a passenger compartment of a vehicle. The capacitance operation device 1 has a surface exposing from the instrument panel into the passenger compartment, and the surface provides a design surface. The capacitance operation device 1 has a plurality of switch operation surfaces 11. The switch operation surfaces 11 are contact-operated by an operation body F, such as a user's fingertip. For example, when the user contacts one of the switch operation surfaces 11 with his/her fingertip F, a subject operation is performed. For example, when the user contacts a switch operation surfaces 11 associated with an air conditioning device, the air conditioning device is actuated and an operation state of the air conditioning device is displayed on a liquid crystal display part 13.

Figure 2:
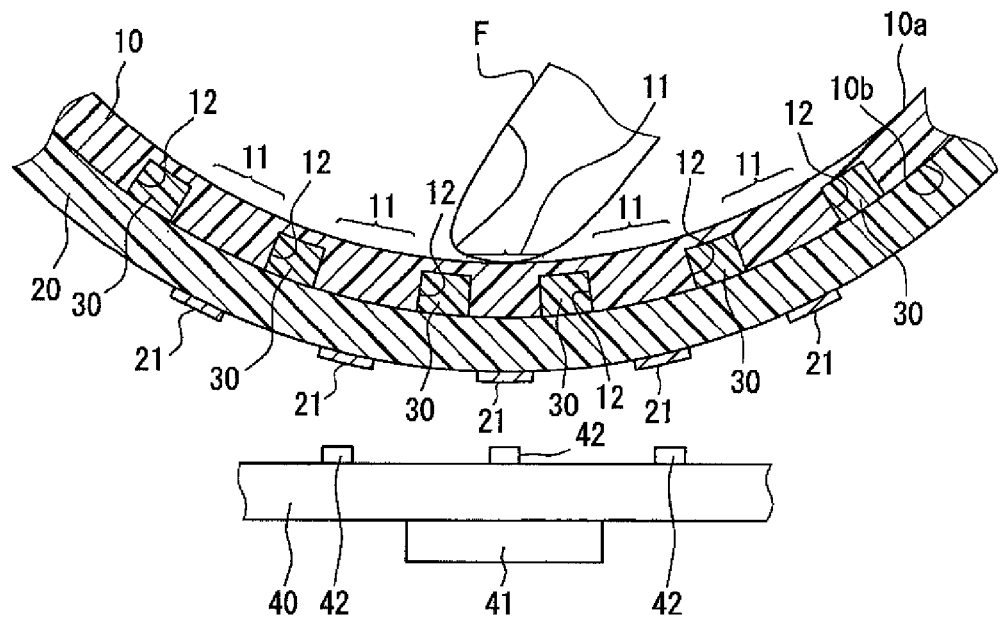
FIG. 2 is a cross-sectional view taken along a line II-II in FIG. 1.

The switch operation surfaces 11 are formed in an operation plate 10. The operation plate 10 has a curved plate shape having a uniform thickness and being curved about an imaginary line X, as shown in FIGS. 1 and 2. For example, the operation plate 10 has a curved shape with a radius of curvature of approximately 40 mm. The operation plate 10 is made of a translucent resin material that allows light to pass through. The resin material is, for example, a polycarbonate.

The operation plate 10 has a design surface 10a facing toward a user to be seen by the user. Specific portions of the design surface 10a function as the switch operation surfaces 11. In other words, the operation plate 10 has a front surface providing the design surface 10a, and the front surface includes the switch operation surfaces 11. On each of the switch operation surfaces 11, a letter or a symbol indicating a target to be operated is printed. The operation plate 10 is curved toward a backside, that is, to be convex toward the backside of the design surface 10a. In other words, the design surface 10a has a concave shape.

The operation plate 10 has a rear surface 10b opposite to the design surface 10a. A plurality of grooves 12 is formed on the rear surface 10b. The grooves 12 have a tubular shape. For example, the grooves 12 have a cylindrical shape and define a circular opening on the rear surface 10b. As shown in FIG. 1, the grooves 12 are formed on the rear surface 10b at positions that do not correspond to the switch operation surfaces 11.

Each of the grooves 12 is filled with an adhesive agent 30. The adhesive agent 30 is sufficiently filled in the groove 12 so that the entirety of the groove 12 is filled with the adhesive agent 30. The adhesive agent 30 is filled in the groove 12 so that a surface of the adhesive agent 30 exposing from the opening of the groove 12 is coplanar with the rear surface 10b.

An electrode film 20 is adhered to the rear surface 10b of the operation plate 10. The electrode film 20 supports electrodes 21. In particular, portions of the electrode film 20 opposing to the grooves 12 are adhered to the operation plate 10 through the adhesive agent 30. Portions of the electrode film 20 without opposing to the grooves 12 are in contact with the rear surface 10b without being adhered with the adhesive agent 30. Since the electrode film 20 is adhered to the operation plate 10 in this manner, the electrode film 20 has a curved shape along the rear surface 10b.

The electrodes 21 are disposed on the surface of the electrode film 20 away from the operation plate 10. The electrodes 21 are deposited on the surface of the electrode film 20 such as by a vapor deposition technique or the like. The electrode film 20 is made of a resin material having flexibility and translucency that allows light to pass through. For example, the resin material of the electrode film 20 is a polyethylene terephthalate (PET). The electrode 21 has a sheet shape and is made of a translucent resin that allows light to pass through. For example, the electrode 21 is made of indium tin oxide (ITO). The electrodes 21 are arranged on the electrode film 20 at positions corresponding to the switch operation surfaces 11. Each of the electrodes 21 has the same shape and the same size as a corresponding switch operation surface 11.

Although not illustrated, the electrode film 20 is provided with wirings. An end of each wiring is connected to a corresponding electrode 21, and an opposite end of the wiring is connected to a circuit board 40. A detection signal outputted from the electrode 21 is provided to a microcomputer 41 disposed on the circuit board 40 through the wiring. The detection signal is a signal indicative of a change in voltage according to a change in capacitance caused between the fingertip F and the electrode 21. The electrodes 21 are correspondingly arranged for the switch operation surfaces 11. The detection signal outputted from each of the electrodes 21 is provided to the microcomputer 41.

The microcomputer 41 determines whether the fingertip F contacts the switch operation surface 11 based on the change of the detection signal. When the microcomputer 41 determines that the fingertip F contacts the switch operation surface 11, the microcomputer 41 outputs an ON signal to the object to be operated so that the object to be operated performs a desired operation. For example, it is assumed that the object to the operated is a blower of the air conditioning device. In this case, when the user touches the switch operation surface 11 for setting an air volume with his/her fingertip F, the setting of the air volume can be changed. With this change, the operation of the blower is controlled. For example, a rotation speed of the blower is changed.

When the voltage of the detection signal outputted from the subject electrode 21 is equal to or greater than a predetermined threshold, the microcomputer 41 determines that the fingertip F contacts the switch operation surface 11 that corresponds to the subject electrode 21. In other words, the contact is determined when the increase in capacitance is equal to or greater than a predetermined amount, based on a principle of a self-capacitance detecting system.

Specifically, when the fingertip F is not in contact with the switch operation surface 11, a parasitic capacitance is generated between the corresponding electrode 21 and a ground pattern or the like of the circuit board 40 adjacent to the corresponding electrode 21. A human body as a conductor is grounded to a virtual ground. Therefore, when the fingertip F comes close to the switch operation surface 11, a static capacitance occurs between the electrode 21 and the fingertip F. An approach (contact operation) of the fingertip F can be detected by measuring the amount of increase of the static capacitance.

Light sources 42 are arranged for the electrodes 21, on the side opposite to the switch operation surfaces 11. The light sources 42 are, for example, light emitting diodes. The light sources 42 are disposed on the circuit board 40. The light sources 43 are correspondingly arranged for the electrodes 21. The light emitted from the light source 43 is conducted to the corresponding electrode 21 through a light conducting member (not shown). Further, the light passes through the corresponding electrode 21, the electrode film 20 and the operation plate 10 in turn. As the light passes through the corresponding switch operation surface 11, the corresponding switch operation surface is illuminated. On the design surface 10a, portions other than the switch operation surfaces 11 are coated with a light shielding paint.

Figure 3:
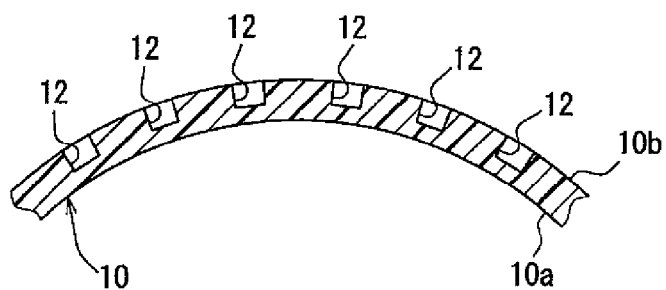
FIG. 3 is a cross-sectional view for illustrating a step of forming grooves according to the first embodiment.

Next, a method of manufacturing the capacitance operation device 1 will be described with reference to FIGS. 3 to 6. As shown in FIG. 3, firstly, grooves 12 are formed on the rear surface 10b of the operation plate 10 (groove-forming step). In particular, a die for molding the operation plate 10 has portions for forming the grooves 12. Thus, the grooves 12 are formed at the same time as molding the operation plate 10 with a resin in the die.

Figure 4:
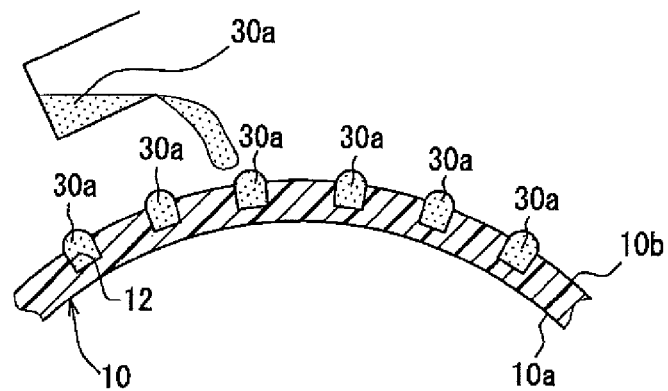
FIG. 4 is a cross-sectional view for illustrating a step of filling an adhesive agent in the grooves according to the first embodiment.

Next, as shown in FIG. 4, a liquid-state adhesive agent 30a in a liquid state is deposited in the grooves 12 so that the grooves 12 are filled with the liquid-state adhesive agent 30a (filling step). In this case, the liquid-state adhesive agent 30a has a predetermined viscosity so as to restrict the liquid-state adhesive agent 30a from flowing out from the grooves 12 when being filled in the grooves 12. In particular, the liquid-state adhesive agent 30a has a viscosity of 0.01 to 10 Pa·s at a temperature from 20 degrees Celsius (° C.) to 90 degrees Celsius, for example. When the adhesive agent 30a has such a viscosity, the liquid-state adhesive agent 30a filled in the groove 12 keeps a state that rises with a surface tension as shown in FIG. 4. Therefore, it is less likely that the liquid-state adhesive agent 30a will flow out from the grooves 12. An example of the liquid-state adhesive agent 30a satisfying these conditions is a UV curable adhesive that is a liquid state at a normal temperature, such as an acrylic resin-based adhesive.

When the depth of the grooves 12 is excessively large, it is difficult to form the grooves 12 on the operation plate 10. On the other hand, when the depth of the grooves 12 are too small, it is difficult to control the amount of the adhesive agent 30a filled in the grooves 12 such that the liquid-state adhesive agent 30a is sufficiently filled in the grooves 12. In consideration of these points, the depth of the grooves 12 is, for example, in a range from 0.01 mm to 5 mm.

When the distance between the adjacent grooves 12 is excessively large, the number of the grooves 12 is insufficient. That is, the number of adhering points is insufficient, and hence it is concerned that the adhering strength will be insufficient. On the other hand, when the distance between the adjacent grooves 12 is too small, the number of the grooves 12 is large. Therefore, it is difficult to form the grooves 12 on the operation plate 10. In consideration of these points, the distance between the adjacent grooves 12 is, for example, in a range from 0.2 mm to 50 mm. In the present embodiment, the depth of the grooves 12 is approximately 0.05 mm. The distance between the adjacent grooves 12 is approximately 5 mm. The diameter of the opening of the groove 12 is approximately 3 mm.

Figure 5:
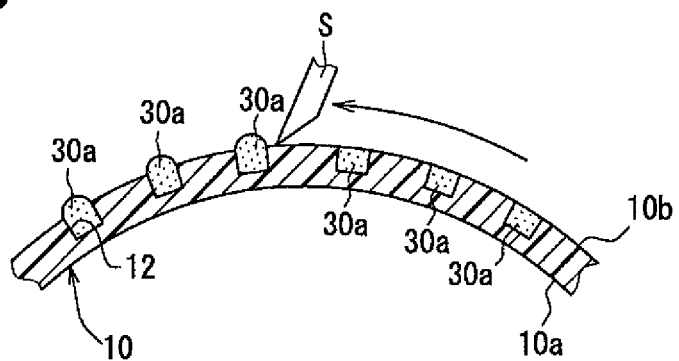
FIG. 5 is a cross-sectional view for illustrating a step of removing an excess adhesive agent according to the first embodiment.

Next, as shown in FIG. 5, a squeezing tool S is moved along the rear surface 10b of the operation plate 10 to have a line contact with the rear surface 10b so that the adhesive agent 30a overflowing from the grooves 12 is removed from the rear surface 10b (removing step). In particular, an excess liquid-state adhesive agent 30a rising over the top end of the grooves 12 due to the surface tension is removed by the squeezing tool S. As a result, a top surface of the liquid-state adhesive agent 30a exposing from the opening of the grooves 12 is coplanar with the rear surface 10b of the operation plate 10.

Figure 6:
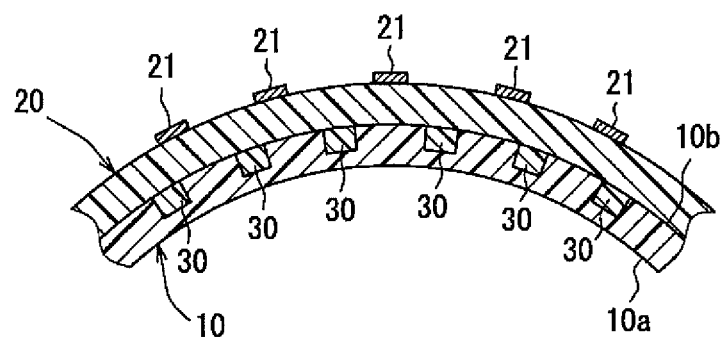
FIG. 6 is a cross-sectional view for illustrating a step of adhering an electrode film to an operation plate according to the first embodiment.

Next, as shown in FIG. 6, the electrode film 20 is pressed against the rear surface 10b of the operation plate 10 to adhere the electrode film 20 to the rear surface 10b (adhering step). In this case, the electrode film 20 is curved along the curve of the rear surface 10b. In the state where the electrode film 20 is pressed against the rear surface 10b, the liquid-state adhesive agent 30a is irradiated with an ultraviolet ray. As a result, the liquid-state adhesive agent 30a is cured while chemically changing the electrode film 20 and the operation plate 10. Therefore, each of the electrode film 20 and the operation plate 10 is chemically bonded with the adhesive agent 30 at the molecular level. In this case, the liquid-state adhesive agent 30a becomes the adhesive agent 30 when being cured.

That is, the electrode film 20 is adhered to the operation plate 10 with the adhesive agent 30 filled in the grooves 12. In this case, the electrode film 20 is adhered to the operation plate 10 in such a state that portions of the rear surface 10b other than the grooves 12 are in contact with the electrode film 20 without being adhered with the adhesive agent 30.

In the present embodiment described above, the following features are provided. Further, the following advantageous effects are achieved.

(1) The electrode film 20 is adhered to the operation plate 10 by chemical bonding using the adhesive agent 30 that can be cured after being filled in the grooves 12. Therefore, the electrode film 20 can be firmly adhered to the operation plate 10, as compared with a case where the electrode film 20x is adhered using the adhesive tape 90 as shown in FIG. 10. Therefore, the reliability of adhering improves.

(2) The adhesive agent 30 is filled in the grooves 12 formed on the rear surface 10b of the operation plate 10. Therefore, the portions of the rear surface 10b where the grooves 12 are not formed are in contact with the electrode film 20 without the adhesive agent 30. Accordingly, it is less likely that the distance between the switch operation surface 11 and the electrode 21 will be affected by the adhesive agent 30. Therefore, deterioration of accuracy of detecting the contact of the operation body can be restricted.

(3) The liquid-state curable adhesive agent 30a, which is in the liquid state when being filled in the grooves 12 and then is cured, is used for the adhesive agent 30. Therefore, even if the amount of the liquid-state adhesive agent 30 filled in the grooves 12 is slightly insufficient, the liquid-state adhesive agent 30a can be drawn toward the electrode film 20 by the surface tension. Therefore, the electrode film 20 is securely adhered to the operation plate 10. Even if the amount of the liquid-state adhesive agent 30a filled in the groove 12 is slightly large, the excess liquid-state adhesive agent 30a overflowing from the groove 12 is removed. Therefore, it is less likely that the adhesive agent 30 will exist between the portions of the rear surface 10b where the grooves 12 are not formed and the electrode film 20. As such, the distance between the switch operation surface 11 and the electrode 21 will not be affected by the adhesive agent 30.

As described above, even if there is an error in the filled amount of the liquid-state adhesive agent 30a between the grooves 12, the electrode film 20 is properly adhered to the operation plate 10, and the adhesive agent 30 will not affect the distance between the switch operation surfaces 11 and the electrodes 21. Even if the excess adhesive agent 30a cannot be completely removed, the liquid-state adhesive agent 30a that overflows from the grooves 12 and remains even after the removing forms a very thin film. Therefore, it is less likely that the adhesive agent 30 will affect the distance between the switch operation surface 11 and the electrode 21.

(4) For example, in a case where the electrode film 20 is adhered to the curved operation plate 10 using the adhesive tape 90 shown in FIG. 10, there is a possibility that the adhesive tape 90 cannot be along the curved surface of the operation plate 10 and wrinkles 90a are generated in the adhesive tape 90 during the adhering. In the present embodiment, on the other hand, even if the operation plate 10 has the curved shape, the electrode film 20 is adhered to the operation plate 10 through the adhesive agent 30a filled in the grooves 12. Therefore, the reliability of the adhering improves.

(5) The switch operation surface 11 allows the light to transmit. That is, the switch operation surface 11 is illuminated while transmitting the light. The grooves 12 are formed on the rear surface 10b of the operation plate 10 at positions without overlapping the switch operation surfaces 11. Therefore, it is less likely that the outlines of the grooves 12 will be visible on the design surface 10a when the switch operation surfaces 11 are illuminated. As such, an appearance of the design surface 10a enhances.

Second Embodiment

Figure 7:
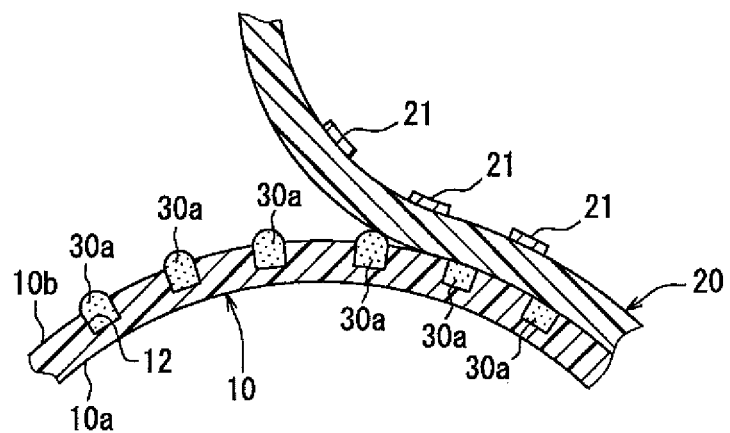
FIG. 7 is a cross-sectional view for illustrating a step of removing an excess adhesive agent and a step of adhering an electrode film according to a second embodiment of the present disclosure.

In the removing of the first embodiment, the excess liquid-state adhesive agent 30a is removed using the squeezing tool S. In the removing of the second embodiment, on the other hand, the end of the electrode film 20 is pressed against the rear surface 10b of the operation plate and then the portion pressed against the rear surface 10b is gradually moved toward the other end of the electrode film 20, as shown in FIG. 7. Therefore, the excess liquid-state adhesive agent 30a is moved out, that is, squeezed toward the other end of the electrode film 20, between the rear surface 10b and the electrode film 20. In this way, the removing is performed.

Also in the embodiment, the adhering structure where the electrode film 20 is adhered to the operation plate 10 with the adhesive agent 30 filled in the grooves 12 is the same as that of the first embodiment.

As described above, also in the second embodiment, it is less likely that the distance between the switch operation surfaces 11 and the electrodes 21 will be affected by the adhesive agent 30, similar to the first embodiment. Further, the reliability of adhering improves. The excess adhesive agent 30a can be removed by pressing the electrode film 20 against the rear surface 10b of the operation plate during the adhering. Therefore, the capacitance operation device 1 can be efficiently manufactured.

Third Embodiment

Figure 8:
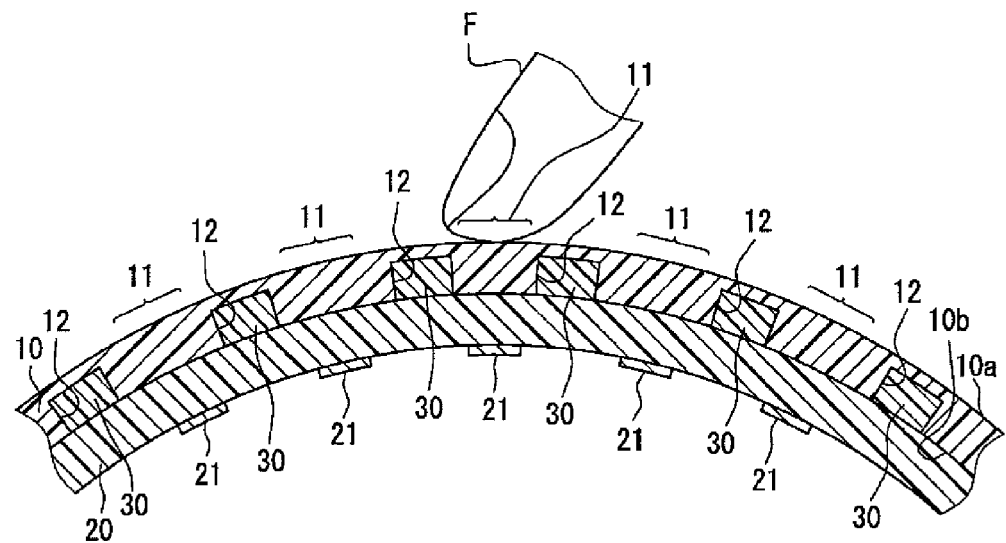
FIG. 8 is a cross-sectional view of a capacitance operation device according to a third embodiment of the present disclosure.

The operation plate 10 of the first embodiment has a curved shape that is convex toward a direction opposite to the design surface 10a. In the third embodiment, on the other hand, the operation plate 10 has a curved shape that is convex toward the design surface 10a, as shown in FIG. 8.

Also in this embodiment, the adhering structure where the electrode film 20 is adhered to the operation plate 10 with the adhesive agent 30 filled in the grooves 12 is the same as that of the first embodiment.

Namely, irrespective of the curved direction of the operation plate 10, the structure of adhering the electrode film 20 to the operation plate 10 with the adhesive agent 30 filled in the grooves 12 can be employed.

Fourth Embodiment

Figure 9:
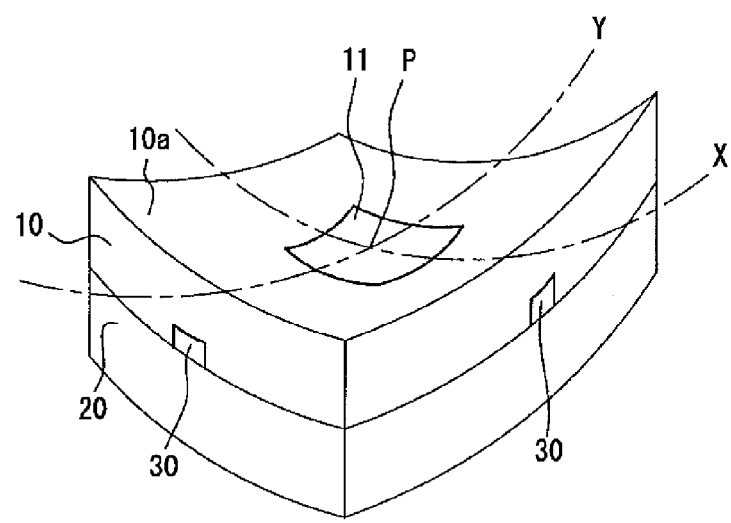
FIG. 9 is a perspective view of a capacitance operation device according to a fourth embodiment of the present disclosure.

In the first embodiment, the operation plate 10 is curved about the imaginary line X and defines a straight ridge line along the imaginary line X. In the fourth embodiment, on the other hand, the operation plate 10 is curved about two imaginary lines X, Y, which intersect each other, and has a top at an intersection P between the imaginary lines X, Y, as shown in FIG. 9.

Also in this embodiment, the adhering structure where the electrode film 20 is adhered to the operation plate 10 with the adhesive agent 30 filled in the grooves 12 is the same as that of the first embodiment.

Namely, irrespective of the curved shape of the operation plate 10, the structure of adhering the electrode film 20 to the operation plate 10 with the adhesive agent 30 filled in the grooves 12 can be employed.

In the curved operation plate 10 having the top P as described above, it is very difficult to adhere the electrode film 20 using the adhesive tape 90 shown in FIG. 10, and wrinkles 90a are easily generated. In the present embodiment, the electrode film 20 is adhered to the curved operation plate 10 having the top P with the adhesive agent 30 filled in the groove 12. Therefore, the reliability of adhering improves, as described above.

Other Embodiments

The present disclosure may not be limited to the embodiments described above, but may be modified in the following manner. The technical features of the embodiments described above may be combined in any various ways.

In the second embodiment, the adhering and the removing are performed simultaneously by pressing the electrode film 20 against the rear surface 10b of the operation plate 10. As another example, the filling of the liquid-state adhesive agent 30a may also be performed simultaneously with the adhering and the removing.

In particular, the liquid-state adhesive agent 30a with the amount necessary to be filled in the plural grooves 12 is first deposited on the rear surface 10b. Then, the liquid-state adhesive agent 30a deposited on the rear surface 10b is moved out from between the rear surface 10b and the electrode film 20 by the pressing, as shown in FIG. 7. In this case, the part of the liquid-state adhesive agent 30a is filled in the grooves 12, and the excess part of the liquid-state adhesive agent 30a is moved out from the one end of the electrode film 20 toward the other end of the electrode film 20. Therefore, by the pressing shown in FIG. 7, the filling, the adhering and the removing are simultaneously performed.

In the first embodiment, the microcomputer 41 outputs an ON signal to the target to be operated when the microcomputer 41 determines that the fingertip F is in contact with the switch operation surface 11. Namely, the capacitance operation device 1 functions as an on switch to operate the target to be operated. As another example, the present disclosure may be employed to a capacitance operation device that functions as a touch-pad device. The touch-pat device is a capacitance operation device that detects a direction of movement of the fingertip F (direction of contact operation), when the operation surface is traced by the fingertip F.

In the first embodiment, the opening of the groove 12 has a circular shape. As another embodiment, the opening of the groove 12 may has any other shape, such as a rectangular shape.

In the first embodiment, the grooves 12 are formed at plural positions in a dotted pattern, when viewed from the front. As another example, the grooves 12 may be formed into a stripe pattern extending in a predetermined direction, when viewed from the front. In a case where the operation plate 10 has the shape curved about the imaginary line X and defines the ridge line along the imaginary line X, the grooves 12 may be formed in the stripe pattern extending parallel to the ridge line. As further another example, the grooves 12 may be formed into a stripe shape traversing the electrode film 20 over the entire width of the electrode film 20.

In the first embodiment, the operation plate 10 has the radius of curvature of approximately 40 mm. The present disclosure may be employed to a capacitance operation device having a curved operation plate with the radius of curvature in a range from 10 mm to 3000 mm.

In the first embodiment, the ITO is used to the electrodes 21. As another example, a conductive polymer, such as polyethylenedioxythiophene-polystyrene sulfonate (PEDOT-PSS), may be used to the electrode 21.

The operation plate 10 may have a plate shape with a uniform thickness. Alternatively, the operation plate 10 may have a plate shape with an uneven thickness.

The detection of the fingertip F using the electrode 21 may not be limited to a self-capacitance detection method, but may be performed by a mutual-capacitance detection method.

The shape of the grooves 12 may not be limited to the tubular shape. For example, the grooves 12 may have a conical shape. As another example, the opening of the grooves 12 may have a rectangular shape.

In the embodiments described above, the capacitance operation device 1 is assumed to be operated by touching the operation surface 11 through a user's fingertip F. Namely, the fingertip F corresponds to the operation body. Alternatively, the operation body may be a device or a tool other than the part of the human body. For example, the operation body may be an operation member having a pen-like shape, and the operation surfaces 11 may be operated by touching with the operation member.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A capacitance operation device comprising:
an operation plate having an operation surface to be contact-operated by an operation body;
an electrode outputting a detection signal according to a change in capacitance generated between the electrode and the operation body; and
an electrode film supporting the electrode, wherein
the operation plate has a rear surface on a side opposite to the operation surface,
the rear surface of the operation plate is formed with a plurality of grooves,
the plurality of grooves are filled with an adhesive agent,
the electrode film is adhered to the rear surface of the operation plate with the adhesive agent,
the electrode is supported on a surface of the electrode film opposite to the operation plate at a position corresponding to the operation surface of the operation plate,
the plurality of grooves on the rear surface of the operation plate are located outside of a corresponding area corresponding to the operation surface, and
the rear surface of the operation plate is continuous without defining a cavity, at the corresponding area located between the plurality of grooves.

2. The capacitance operation device according to claim 1, wherein
the operation plate has a curved shape, and
the electrode film is disposed along the curved shape of the operation plate.

3. The capacitance operation device according to claim 1, wherein
each of the grooves is disposed on the rear surface of the operation plate at a position without corresponding to the operation surface, and
the electrode film is in contact with the corresponding area of the rear surface without being adhered with the adhesive agent.

4. The capacitance operation device according to claim 1, wherein
the operation surface is printed with one of a letter and a symbol indicating a target to be operated.

5. The capacitance operation device according to claim 1, wherein the operation surface has a shape with four sides, and at least four grooves are disposed adjacent to the four sides of the operation surface portion outside of the area of the rear surface.

6. The capacitance operation device according to claim 1, wherein the operation plate includes a plurality of operation surfaces including the operation surface, the plurality of grooves are disposed outside of corresponding areas of the rear surfaces of the operation plate, the corresponding areas respectively corresponding to the operation surfaces, and the rear surface of the operation plate other than the grooves is coplanar, and the rear surface of the operation plate other than the grooves includes surface portions contacting the electrode film without the adhesive agent.

* * * * *